United States Patent
Keith et al.

(10) Patent No.: US 6,428,273 B1
(45) Date of Patent: Aug. 6, 2002

(54) TRUNCATED RIB TURBINE NOZZLE

(75) Inventors: Sean Robert Keith, Fairfield; Mark Edward Stegemiller, Franklin; Steven Robert Brassfield, Cincinnati, all of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/755,352

(22) Filed: Jan. 5, 2001

(51) Int. Cl.[7] ............................................. F04D 29/58
(52) U.S. Cl. ..................................................... 416/97 R
(58) Field of Search .............................. 415/115, 116; 416/96 R, 96 A, 97 R

(56) References Cited

U.S. PATENT DOCUMENTS

| | | | |
|---|---|---|---|
| 4,153,386 A | * | 5/1979 | Leogrande et al. ....... 416/97 R |
| 4,183,716 A | | 1/1980 | Takahara et al. |
| 4,257,734 A | | 3/1981 | Guy et al. |
| 4,616,976 A | | 10/1986 | Lings et al. |

OTHER PUBLICATIONS

CFM International, CFM56 Engine, HP Stage 1 Nozzle, two drawings, in commercial use in the U.S. for more than one year.
GE Aircraft Engines, "CF6–50 Engine HP Stage 1 Nozzle Vane," in commercialin the U.S. for more than one year.

* cited by examiner

*Primary Examiner*—Edward K. Look
*Assistant Examiner*—Dwayne J White
(74) *Attorney, Agent, or Firm*—Rodney M. Young; Francis L. Conte; William Scott Andes

(57) ABSTRACT

A turbine nozzle includes vanes joined to outer and inner bands. Each vane includes opposite sidewalls extending between leading and trailing edges, with an internal bridge extending between the sidewalls to effect forward and aft cavities. Side ribs extend along the sidewalls and project inwardly into the cavities. Each of the side ribs is truncated adjacent the bridge to uncouple the ribs therefrom and increase nozzle life.

21 Claims, 4 Drawing Sheets

TRUNCATED RIB TURBINE NOZZLE

BACKGROUND OF THE INVENTION

The present invention relates generally to gas turbine engines, and, more specifically, to high pressure turbine nozzles therein.

In a gas turbine engine, air is pressurized in a compressor and mixed with fuel in a combustor for generating hot combustion gases from which energy is extracted in several turbine stages disposed downstream from the combustor. The high pressure turbine (HPT) first receives the hottest combustion gases from the combustor for powering the compressor, with additional energy being extracted therefrom in a low pressure turbine (LPT) which typically powers a fan in an aircraft turbofan engine application.

The HPT includes a stationary turbine nozzle which first receives the combustion gases from the combustor and channels them to first stage turbine rotor blades supported from a corresponding rotor disk. The turbine nozzle is protected from the hot combustion gases by air cooling using the pressurized discharge air from the compressor. The nozzle includes a row of hollow stator vanes having internal cooling circuits discharging air through a multitude of various holes extending through the sidewalls of the vanes.

Nozzle cooling is inherently complex in view of the three dimensional aerodynamic profile of the vane airfoils and the varying heat load over the pressure and suction side surfaces thereof. It is desirable to match the cooling air requirements against the experienced heat loads for minimizing the amount of cooling air diverted from the combustion process while correspondingly minimizing differential temperatures experienced by each vane and the resulting thermally induced stress therein.

However, the vanes themselves are directly exposed to the hot combustion gases and are mounted in relatively cool outer and inner bands, typically in circumferential segments for minimizing thermal stress due to differential thermal expansion and contraction. In a typical cooling arrangement, a perforate impingement baffle or insert is mounted inside each vane for directing cooling air in discrete jets against the inner surface of the vane for enhanced cooling thereof. The impingement baffle must be accurately spaced from the inner surface of the vanes for controlling impingement cooling, with stand-off features formed on either the baffle or the vane inner surface depending upon the particular nozzle design.

In one conventional design, each vane includes a midchord partition or bridge extending between the two sidewalls for defining forward and aft radial cavities in which corresponding impingement baffles are disposed. The two cavities are separately provided with portions of compressor discharge air for separately cooling the forward and aft portions of each vane to better match the external heat load.

However, the bridge is operated relatively cold since it is mounted inside the vane and is itself directly cooled by the air channeled inside the vane. The cold bridge is thusly joined to the two hot sidewalls at local regions subject to substantial differential thermal expansion and contraction due to the relatively cold and hot operating temperatures thereof.

Nevertheless, cold bridge turbine nozzle designs are common in commercial practice. For example, a turbine nozzle having two impingement baffles separated by a cold bridge has enjoyed successful commercial service in the United States for many years. This exemplary nozzle includes axially or chordally extending side ribs disposed inside each cavity on the opposite sidewalls thereof to provide stand-off features for centrally locating each impingement baffle in its corresponding cavity.

The side ribs stiffen or add strength to the thin sidewalls of the vanes and support the impingement baffles with relatively small clearances therebetween. The air discharged through the baffle holes firstly impinges the inner surfaces of the sidewalls, and is then confined radially by the ribs for discharge through inclined film cooling holes extending through the vane sidewalls in the forward and aft cavities, as well as for discharge through a trailing edge cooling circuit.

The trailing edge cooling circuit in the commercially used nozzle includes axially extending partitions or additional bridges which extend from the aft end of the aft cavity to the vane trailing edge. The partitions are spaced apart along the span of the vane to define corresponding trailing edge discharge channels terminating at corresponding apertures at the trailing edge. Radially extending turbulators are found in the trailing edge channels for enhancing the cooling effectiveness of the spent impingement air discharged through the trailing edge cooling circuit.

In the commercial nozzle example introduced above, the side ribs inside both vane sidewalls extend to and are integrally formed with the cold bridge. In this way the side ribs wrap around the corner junctions of the sidewalls and the cold bridge in a smooth transition.

The wrap-around side ribs at the aft end of the forward cavity provide an effective stand-off feature to limit the aft travel of the forward impingement baffle and maintain a minimum gap with the cold bridge. Correspondingly, the side ribs in the aft cavity along the vane suction sidewall also wrap or blend toward the opposite pressure sidewall where the two sidewalls converge closely together just forward of the trailing edge. Various ones of the trailing edge partitions extend locally forward and form integral continuations of respective ones of the side ribs for providing a corresponding stand-off feature to limit the aft travel of the aft impingement baffle.

In this configuration, the axially elongate side ribs are effective for circumferentially centering the individual impingement baffles in their respective vane cavities, with the aft blending of each side rib providing a convenient aft stand-off feature. And, the extended trailing edge partitions provide complete cold bridges across the two sidewalls in the aft cavity to limit axial travel of the aft baffle.

Although this commercial design has enjoyed many years of successful commercial service in the United States with a correspondingly large number of thermal cycles of operation, thermally induced cracking is being experienced which correspondingly limits the useful life of the nozzles requiring their replacement in a typical maintenance outage. Such cracking is being experienced in the vane sidewalls at the cold bridge, and in particular on the convex sidewall of the vane.

Accordingly, it is desired to improve the design of the turbine nozzle for increasing the useful life thereof.

BRIEF SUMMARY OF THE INVENTION

A turbine nozzle includes vanes joined to outer and inner bands. Each vane includes opposite sidewalls extending between leading and trailing edges, with an internal bridge extending between the sidewalls to effect forward and aft cavities. Side ribs extend along the sidewalls and project inwardly into the cavities. Each of the side ribs is truncated adjacent the bridge to uncouple the ribs therefrom and increase nozzle life.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
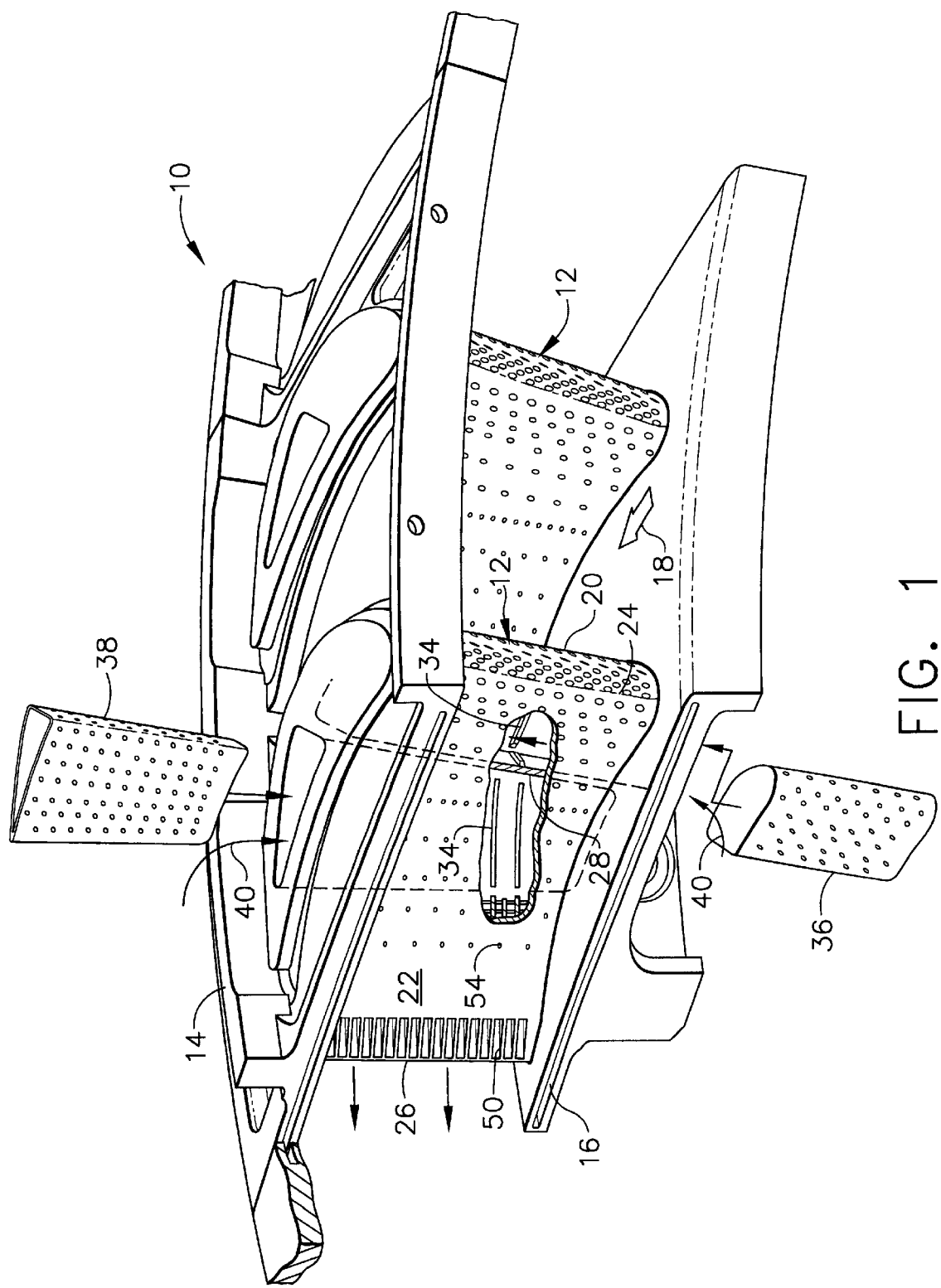
FIG. 1 is an isometric view of a portion of an exemplary high pressure turbine nozzle of a gas turbine engine configured for powering an aircraft in flight.

Illustrated in FIG. 1 is a portion of a high pressure turbine nozzle 10 of a turbofan gas turbine engine configured for powering an aircraft in flight in an exemplary embodiment. The nozzle is axisymmetrical around the axial or centerline axis of the engine and defines an annular ring, only a portion of which is illustrated in FIG. 1, having a plurality of circumferentially spaced apart airfoil vanes 12 therein. The individual vanes 12 are typically manufactured by conventional casting and are fixedly mounted in corresponding radially outer and inner arcuate bands 14,16 in any suitable manner such as by being cast therewith.

In a typical configuration, two vanes 12 are mounted in each band pair which circumferentially adjoin each other to form a collective, segmented annular nozzle. The nozzle is disposed directly at the outlet of an annular combustor (not shown) which discharges hot combustion gases 18 therethrough for being channeled to a row of first stage turbine rotor blades (not shown) which extract energy therefrom for powering a compressor (not shown) of the engine.

The vanes 12 are identical to each other and each includes a first, outwardly convex suction sidewall 20, and a circumferentially opposite second, outwardly concave pressure sidewall 22. The two sidewalls extend axially or chordally between corresponding leading and trailing edges 24,26 of the vane, and also extend radially in span between tip and root fixedly mounted in the corresponding bands 14,16.

Figure 2:
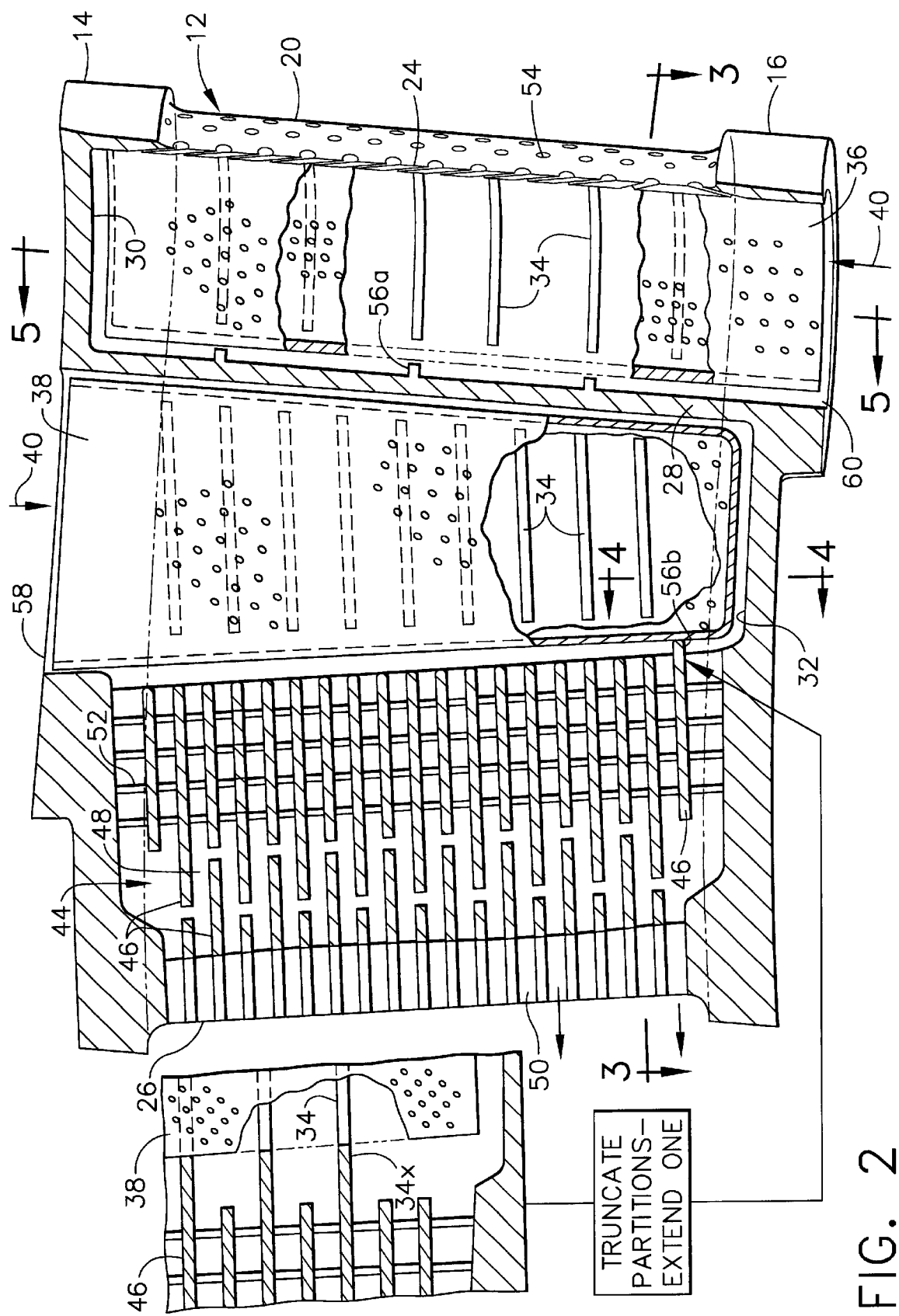
FIG. 2 is a radial sectional view through one of the vanes illustrated in FIG. 1 in conjunction with a flowchart representation of a method for increasing life of the nozzle.

As initially shown in FIG. 1, and in more detail in FIG. 2, each vane also includes an internal radial rib or bridge 28 extending integrally between the two sidewalls in a common casting which is suitably spaced along the chord between the leading and trailing edges of the vane to define or effect a first or forward cavity 30 on the forward side of the bridge bound by the leading edge, and a second or aft cavity 32 on the aft side of the bridge bound by the trailing edge.

Each vane further includes a plurality of axially elongate side ribs 34 which extend chordally along the inner surfaces of the two sidewalls and project inwardly therefrom into the corresponding cavities 30,32. The side ribs 34 are provided to create stand-off features for centering in the respective cavities corresponding forward and aft perforate impingement inserts or baffles 36,38 disposed therein.

Figure 3:
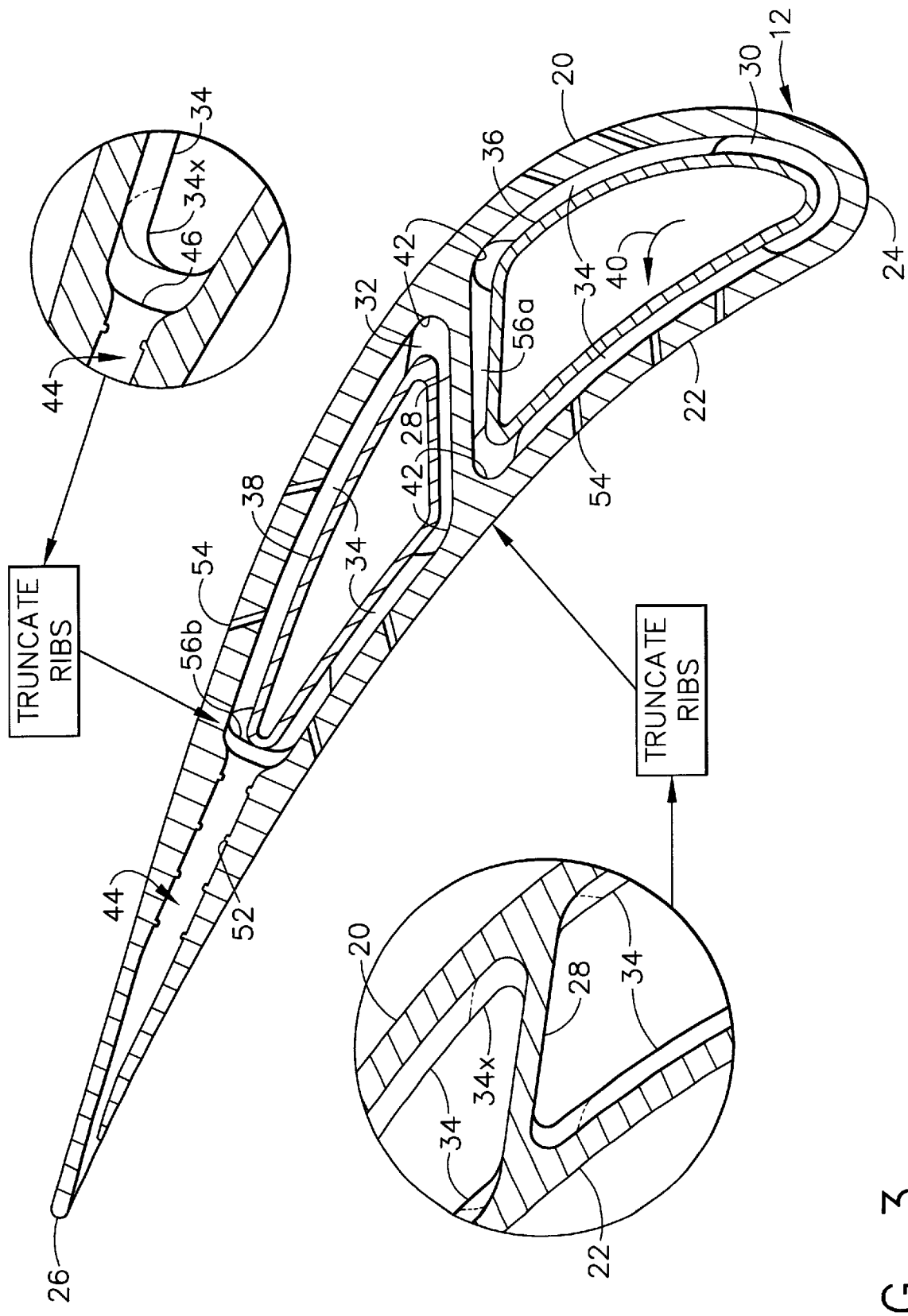
FIG. 3 is a radial sectional view through the vane illustrated in FIG. 2 and taken along line 3—3, in conjunction with preferred method elements in increasing the life of the nozzle.

FIG. 3 illustrates in more detail that the two baffles 36,38 have a suitable configuration for matching the varying internal profile of the two cavities 30,32 as the vane varies in section between the leading and trailing edges in a general crescent or aerodynamic profile. The side ribs 34 extend inwardly in height from the inner surface of the vane to space centrally the respective baffles in the corresponding cavities.

A small clearance or gap is provided between the ribs and the baffle for permitting assembly of the baffles radially into the corresponding cavities. And, the ribs have a suitable height for maintaining the sidewalls of the baffles at the desired spacing from the inner surface of the vane for maximizing efficiency of impingement cooling from the corresponding jets of impingement air discharged through the respective impingement air holes of the baffles toward the inner surfaces of the vane.

As shown in FIGS. 2 and 3, each of the side ribs 34 is truncated in its axial length adjacent the cold bridge 28 to structurally and thermally uncouple the ribs from the bridge for substantially increasing the useful life of the nozzle in accordance with the present invention.

Illustrated schematically in FIG. 3 is an exemplary method of making the nozzle for increasing the useful life of the nozzle vanes over the design described above in the Background section having proven commercial service. In that previous design, the side ribs 34 are configured to initially extend to and are integrally formed with the cold bridge 28 at four corresponding side rib blends 34x. In this previous configuration, the rib blends 34x are integrally formed with the cold bridge 28 at the junctions thereof with the respective sidewalls in a mechanically and thermally coupled configuration.

Since the first sidewall 20 is convex outwardly and defines the suction side of the vane, it affects a different velocity distribution of the combustion gases flowing over the vane than that provided by the generally concave second sidewall 22 defining the vane pressure side. Field experience after years of operation as indicated above has uncovered crack initiation in the convex sidewall near the cold bridge.

In accordance with the present invention, it has been discovered that such crack initiation in high-time turbine nozzle vanes is due to the mechanical and thermal coupling of the side ribs 34 to the cold bridge 28, and in particular at the vane convex sidewall 20.

During operation, the suction sidewall 20 is exposed to hot combustion gases which flow thereover and experiences a relatively high heat load requiring corresponding cooling from inside each vane. Pressurized air 40 is conventionally channeled from the discharge end of the compressor (not shown) for use in cooling the individual vanes. The cooling air 40 first flows through the individual baffles 36,38 and out the impingement holes thereof to direct jets of air against the inner surface of the vane for impingement cooling thereof. The internal bridge 28 separating the forward and aft cavities is protected from the hot combustion gases by the two sidewalls and is itself directly cooled by the cooling air inside the cavities.

The relatively cold bridge 28 joins the relatively hot suction and pressure sidewalls 20,22 of the vane at corresponding joints subject to corresponding differential thermal expansion and contraction. The previous rib blends 34x are also relatively cool and were mechanically coupled to the cold bridge 28 at the two junctions with the sidewalls.

It has been discovered that by truncating the side ribs 34 illustrated in FIG. 3 from the cold bridge 28 along the first sidewall 20 in both the forward and aft cavities 36,38 that the ribs will be structurally and thermally uncoupled from the cold bridge for substantially increasing the useful life of the vane during operation.

In the preferred embodiment illustrated in FIG. 3, the truncated side ribs 34 terminate near the cold bridge 28 at or near corresponding fillets 42 disposed between the first sidewall 20 and the bridge, as well as between the second sidewall 22 and the bridge. In this way, the side ribs may extend closely adjacent to the cold bridge 28, yet terminate just prior thereto at the smooth fillets 42 defined at the junction of the cold bridge and the sidewalls for reducing stress concentration thereat.

The side ribs 34 inside the first cavity 30 along the first sidewall are thusly truncated closely in front of the cold bridge, with the side ribs in the second cavity 32 being truncated just behind the cold bridge along the first sidewall. If desired, the side ribs 34 may terminate further away from the cold bridge and fillets thereat to further uncouple the ribs therefrom.

Similarly, the side ribs 34 may also be truncated from the cold bridge along the second sidewall 22 in both the forward and aft cavities 30,32. The corresponding joint between the cold bridge and the pressure sidewall 22 is thusly also uncoupled from the side ribs 34 for reducing the thermal stress thereat.

Preferably, the side ribs 34 are uncoupled from the cold bridge 28 inside both sidewalls of the vane which reduces the thermal mismatch therebetween, and correspondingly reduces thermally induced stress at the cold bridge joints with the sidewalls resulting in a substantial increase in useful life of the nozzle vane. Analysis indicates a four-fold increase in useful life of the nozzle vane due to the resulting reduction in thermally induced stress at the cold bridge. The previous life-limiting location of the vane at the junction of the cold bridge and the convex sidewall 20 is thusly eliminated, with the life-limiting location being relocated in the vane to a less significant zone permitting the enhanced useful life.

As shown in FIGS. 2 and 3, the side ribs 34 in each cooling air cavity 30,32 preferably extend axially along the two sidewalls for a majority of the axial or chordal length thereof. The axial ribs increase the strength of the thin vane sidewalls in each of the cavities while providing a uniform standoff for centering the respective baffles therein. And, the rows of side ribs in each cavity control the discharge flow of the spent impingement air between corresponding ones of the side ribs and permit tailoring of the vane cooling along its span. In this way, more cooling may be effected near the mid-span of each vane as opposed to the root and tip ends thereof near the corresponding inner and outer bands which have reduced heat loads from the combustion gases.

As also shown in FIGS. 2 and 3, the forward cavity 30 is located between the leading edge 24 and the cold bridge 28, and that bridge is disposed suitably forward of the mid-chord of the vane for providing a dedicated cooling circuit for the leading edge portion of the vane which first receives the hot combustion gases from the combustor. The aft cavity 32 is disposed directly behind the bridge 28 and extends over about the middle third of the vane chord length for cooling the mid-chord region of the vane in another cooling circuit. And, a trailing edge cooling circuit 44 is disposed in each vane in flow communication with the aft cavity 32 for cooling the aft third portion of each vane in a third cooling circuit.

As initially shown in FIG. 2, the trailing edge circuit 44 includes a plurality of axial bridges or partitions 46 spaced apart from each other along the span of the vane to define corresponding axially extending discharge channels 48 terminating at corresponding trailing edge slots or apertures 50. And, rows of radially extending short turbulators 52 are disposed in the entrance region of the trailing edge channels 48 to promote turbulence of the spent impingement air discharged out the vane trailing edges.

In operation, the cooling air 40 is separately channeled through the bands into each of the two vane cavities 30,32 through the corresponding impingement baffles supported therein. The air is first used to impingement cool the inner surfaces of the vane sidewalls, and a portion of the spent air is then discharged through various film cooling holes 54 extending through the sidewalls in any conventional manner. Some of the spent impingement air in the aft cavity 32 is channeled through the film cooling holes, with a remaining portion of the spent air being channeled through the trailing edge cooling circuit 44 for cooling the trailing edge portion of each vane.

As shown in FIG. 3, the side ribs 34 originally extended aft with integral wrapping blends 34x joined to corresponding ones of the trailing edge partitions 46 to provide a series of aft stand-off features to limit the axially aft movement of the aft baffle 38 in the aft cavity in the commercially successful nozzle disclosed in the Background section above.

However, it has also been discovered that the integral connection effected by the blends 34x between the aft ends of the side ribs and the aft cavity and the corresponding trailing edge partitions 46 also locally increase thermally induced stress at the junctions thereof. The partitions 46 are cold bridges which join together the two hot sidewalls of the vane at the trailing edge region, and the side ribs including the previous blends 34x are also relatively cool inside the aft cavity.

Accordingly, it is also desirable to truncate the side ribs 34 along the vane convex sidewall 20 at the aft end of the aft cavity 32 to uncouple the side ribs from the corresponding trailing edge partitions. In a manner similar to uncoupling the side ribs from the cold bridge 28, uncoupling the cold axial partitions 46 from the aft ends of the side ribs running along the inner surface of the convex sidewall 20 uncouples the thermal response and reduces the resulting thermally induced stress at these locations.

By eliminating the aft blends 34x of the corresponding side ribs in the forward and aft cavities illustrated in FIG. 3, the corresponding baffles 36,38 may be subject to undesirable aft movement inside the cavities affecting their local cooling performance. Accordingly, the side rib blends 34x may be replaced by corresponding first and second end ribs 56a,b suitably disposed at the aft ends of each of the two cavities 30,32 for axially abutting the baffles therein.

Depending upon the specific configuration of the cavities 30,32, the opposite side ribs 34 in each cavity may be sufficient for centrally supporting each of the baffles therein both in the transverse or circumferential direction of the nozzle or in the axial or chordal direction. However, the end ribs 56a,b may be used where desired for maintaining a predetermined spacing between the aft or forward ends of the individual baffles and the aft or forward ends of each of the cavities.

In the commercial embodiment disclosed above in the Background section, various ones of the partitions 46 illustrated at the left in FIG. 2 included integral extensions thereof defining the wrap-around blends 34x with the corresponding side ribs 34 to provide multiple aft stand-off features for the aft baffle 38. However, the trailing edge partitions 46 are cold bridges and their junctions with the corresponding side ribs 34 created local regions of thermal mismatch between the cold partitions and the hot sidewalls adversely affecting the useful life of the nozzle vane.

Accordingly, and in a preferred embodiment, the previously coupled trailing edge partitions 46 and side ribs 34 are uncoupled from each other by truncating the aft ends of the extended partitions as shown in FIG. 2 to eliminate the extensions thereat, which corresponds with truncating the aft ends of the corresponding side ribs 34, along the suction sidewall in particular as illustrated in FIG. 3.

Since the truncated partitions 46 are no longer available to provide aft stand-off features for the aft baffle, at least one of the partitions 46 in a plane different than those of the side ribs preferably includes the second end rib 56b extending forward therefrom into the aft cavity 32 as illustrated in FIGS. 2 and 3.

Figure 4:
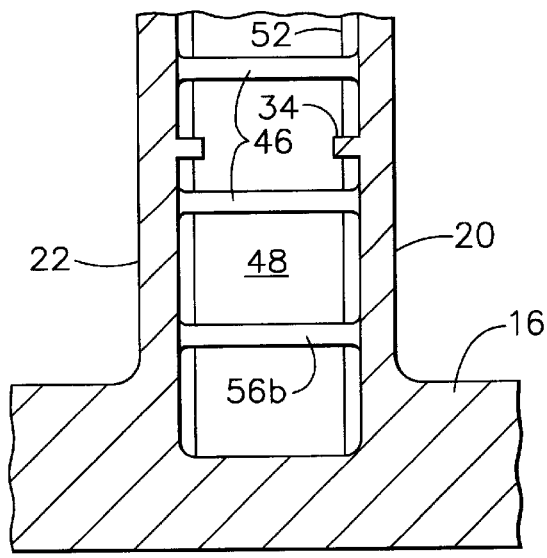
FIG. 4 is a radial sectional view through a portion of the aft cavity illustrated in FIG. 2 and taken along line 4—4.

As best shown in FIG. 4, each of the trailing edge partitions 46 bridges the first and second sidewalls 20,22 and is integral therewith in the common casting. As additionally shown in FIG. 2, a single end rib 56b preferably extends from only the last one of the partitions 46 adjoining the inner band 16 in the exemplary embodiment. Since this end rib 56b is an extension of the corresponding last partition 46, it too bridges the two sidewalls and is operated effectively cold compared to the hot sidewalls during operation.

Accordingly, the end rib 56b illustrated in FIG. 2 is preferably spaced radially from the side ribs 34 along the vane span in the aft cavity 32 for uncoupling the end rib 56b from the side ribs 34 and providing a corresponding stand-off features for the aft baffle 38 while substantially reducing thermally induced stress at this location.

In the exemplary embodiment illustrated in FIG. 2, the outer band 14 includes an outer port 58 at the aft cavity 32 for radially receiving the aft baffle 38 therein during assembly, and through which the cooling air 40 is received. Correspondingly, the inner band 16 at the aft cavity is closed.

Similarly, the inner band 16 includes an inner port 60 at the forward cavity 30 for receiving the forward baffle 36, and through which another portion of the cooling air is received. Correspondingly, the outer band 14 at the forward cavity is closed.

As shown in FIG. 2, all of the trailing edge partitions 46, except the inner last one thereof, are preferably truncated short of the aft end of the aft baffle 38 as well as short of the aft end of the outer port 58. In this way, the aft end of the outer port 58 may be effectively used for providing a stand-off feature for the outer end of the aft baffle 38, while the innermost partition 46 includes the end rib 56b for providing the stand-off feature for the inner end of the baffle.

Since the end rib 56b is uncoupled from the side ribs 34, any thermal mismatch therebetween is minimized. Furthermore, since the end rib 56b is preferably located at the innermost partition 46, it is subject to a substantially cooler environment than the mid-span partitions located at higher heat loads from the combustion gases outside the vane. The cooler location of the inner band and the end rib 56b located thereat minimizes any thermal mismatch between the bridging end rib 56b and the attached vane sidewalls.

As also shown in FIG. 2, a plurality of the first end ribs 56a preferably extend from the radial bridge 28 in the forward cavity 30 and are radially spaced apart from each other along the vane span.

As shown in FIG. 3, the first end ribs 56a are integrally formed with the forward side of the bridge 28 between the opposite vane sidewalls 20,22 in the forward cavity and are truncated in circumferential length at the two sidewalls to uncouple the end ribs from the sidewalls in a manner similar to truncating the side ribs 34 from the cold bridge. In this way, the end ribs 56a provide effective stand-off features for the aft end of the forward baffle 36 yet remain uncoupled from the sidewalls for minimizing thermally induced stress thereat.

Figure 5:
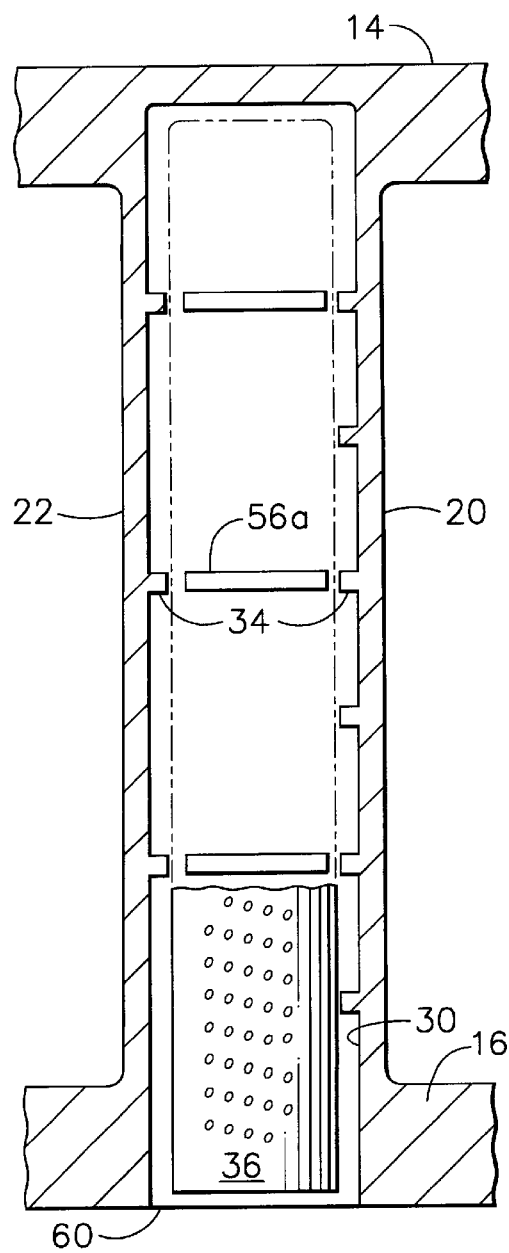
FIG. 5 is a radial sectional view through the forward cavity illustrated in FIG. 2 and taken along line 5—5.

As illustrated in FIG. 5, six exemplary side ribs 34 are radially spaced apart along the first sidewall 20 in the forward cavity 30 with fewer, for example three, side ribs 34 being spaced apart along the opposite second sidewall 22. The pressure-side ribs 34 are preferably located in common radial planes with corresponding ones of the suction-side ribs 34 for centering the baffle 36 therebetween. And, the first end ribs 56a in the forward cavity 30 are preferably coplanar with corresponding ones of the side ribs 34 along both sidewalls 20,22.

The three coplanar ribs 34,56a as best illustrated in FIG. 3 bound the forward baffle 36 around a majority of its circumference for centering the baffle in the forward cavity 30. However, the side ribs 34 and end ribs 56a are structurally uncoupled from each other as well as being uncoupled from the junctions of the cold bridge 28 and the hot sidewalls 20,22.

The forward baffle is thusly effectively centered in the forward cavity with substantially reduced thermal stresses at the junction of the cold bridge and the vane sidewalls, and in particular at the convex sidewall 20 which previously experienced the life-limiting region of the vane. As indicated above, the improved configuration of the stand-off features can promote a four-fold increase in useful of the nozzle vanes as compared to the previous commercial design without these improvements.

The discovery of the cause of the previous life-limiting features of the commercial turbine nozzle has led to a solution requiring little change in the original design yet having a profound effect in increasing useful life substantially. The elongate side ribs are locally uncoupled from the cold bridge 28 as well as from the trailing edge partitions 46 for substantially reducing thermal mismatch therebetween. And, the end ribs 56a,b are introduced in preferred locations for supporting the corresponding impingement baffles without otherwise introducing undesirable thermal mismatch between the end ribs and the hot sidewalls.

The improved features may readily be incorporated into new turbine nozzle designs, as well as retrofitted into existing designs for replacement during normal maintenance outages of a gas turbine engine. A substantial increase in turbine nozzle useful life may be obtained with minor change in nozzle design, with little or no increase in cost of manufacture.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured Letters Patent of the United States is the invention as defined and differentiated in the following claims in which we claim:

1. A turbine nozzle comprising:
    a plurality of vanes fixedly joined to outer and inner bands;
    each vane including opposite first and second sidewalls extending in chord between leading and trailing edges and in span between said bands, and an internal bridge extending integrally between said sidewalls to effect a forward cavity on a forward side thereof bound by said leading edge and an aft cavity on an aft side thereof bound by said trailing edge;

each vane further including a plurality of elongate side ribs extending chordally along said sidewalls forward and aft from said bridge inside said cavities for a majority of chordal length thereof and projecting inwardly from said sidewalls into said cavities; and each of said ribs being truncated adjacent said bridge to uncouple said ribs therefrom.

2. A nozzle according to claim 1 wherein said first sidewall is convex outwardly, and said ribs terminate at said bridge near corresponding fillets disposed therebetween.

3. A nozzle according to claim 2 further comprising forward and aft impingement baffles disposed inside said forward and aft cavities, respectively, and spaced centrally therein by said ribs.

4. A nozzle according to claim 3 further comprising an end rib disposed at an aft end of each of said cavities for abutting said baffles therein.

5. A nozzle according to claim 4 further comprising a trailing edge cooling circuit disposed in each of said vanes in flow communication with said aft cavity therein, and including a plurality of partitions spaced apart along said span to define corresponding discharge channels terminating at corresponding apertures at said trailing edge, and said end rib extends from one of said partitions forward into said aft cavity.

6. A nozzle according to claim 5 wherein said end rib is spaced from said side ribs along said span in said aft cavity, and is uncoupled therefrom.

7. A nozzle according to claim 6 wherein said end rib extends from a last one of said partitions adjoining one of said bands.

8. A nozzle according to claim 7 wherein said end rib bridges said first and second sidewalls.

9. A nozzle according to claim 7 wherein:

said outer band includes an outer port at said aft cavity for receiving said aft baffle, and said inner band is closed at said aft cavity;

said inner band includes an inner port at said forward cavity for receiving said forward baffle, and said outer band is closed at said forward cavity; and said end rib in said aft cavity is disposed adjacent said inner band.

10. A nozzle according to claim 4 wherein said end rib is integrally formed with said bridge between said sidewalls in said forward cavity, and is truncated at said sidewalls to uncouple said end rib therefrom.

11. A nozzle according to claim 10 wherein said end rib in said forward cavity is coplanar with said side ribs along said sidewalls.

12. A nozzle according to claim 11 further comprising a plurality of said end ribs extending from said bridge in said forward cavity, and spaced apart from each other along said span.

13. A method of increasing life of said nozzle according to claim 1 wherein said side ribs initially extend to and are integrally formed with said bridge, comprising:

truncating said side ribs from said bridge along said first sidewall in said aft cavity; and truncating said side ribs from said bridge along said first sidewall in said forward cavity.

14. A method according to claim 13 further comprising blending said truncated side ribs at said bridge near corresponding fillets disposed between said first sidewall and said bridge.

15. A method according to claim 14 further comprising:

truncating said side ribs from said bridge along said second sidewall in said aft cavity; and truncating said side ribs from said bridge along said second sidewall in said forward cavity.

16. A method according to claim 15 wherein said first sidewall is convex outwardly, and further comprising truncating said side ribs along said first sidewall at an aft end of said aft cavity.

17. A turbine nozzle comprising:

a plurality of vanes fixedly joined to outer and inner bands;

each vane including a first convex sidewall and an opposite second concave sidewall extending in chord between leading and trailing edges and in span between said bands, and an internal bridge extending integrally between said sidewalls to effect a forward cavity on a forward side thereof bound by said leading edge and an aft cavity on an aft side thereof bound by said trailing edge;

each vane further including a plurality of elongate side ribs extending chordally along said sidewalls forward and aft from said bridge inside said cavities for a majority of chordal length thereof and projecting inwardly from said sidewalls into said cavities;

each of said ribs being truncated adjacent said bridge to uncouple said ribs therefrom; and forward and aft impingement baffles disposed inside said forward and aft cavities, respectively, and spaced centrally therein by said ribs.

18. A nozzle according to claim 17 wherein said ribs terminate at said bridge at corresponding fillets disposed therebetween, and further including an end rib disposed at an aft end of each of said cavities for abutting said baffles therein.

19. A nozzle according to claim 18 further comprising:

a trailing edge cooling circuit disposed in each of said vanes in flow communication with said aft cavity therein, and including a plurality of partitions spaced apart along said span to define corresponding discharge channels terminating at corresponding apertures at said trailing edge;

said end rib in said aft cavity extending from one of said partitions forward into said aft cavity; and said end rib in said forward cavity being integrally formed with said bridge between said sidewalls and being truncated thereat to uncouple said end rib therefrom.

20. A nozzle according to claim 19 wherein:

said end rib in said aft cavity is spaced from said side ribs along said span therein, and is uncoupled therefrom; and a plurality of said end ribs extend from said bridge in said forward cavity, and are spaced apart from each other along said span.

21. A turbine nozzle comprising:

a plurality of vanes fixedly joined to outer and inner bands;

each vane including a first convex sidewall and an opposite second concave sidewall extending in chord between leading and trailing edges and in span between said bands, and an internal bridge extending integrally between said sidewalls to effect a forward cavity on a forward side thereof bound by said leading edge and an aft cavity on an aft side thereof bound by said trailing edge;

each vane further including a plurality of elongate side ribs extending chordally along said sidewalls forward and aft from said bridge inside said cavities for a majority of chordal length thereof and projecting inwardly from said sidewalls into said cavities;

each of said ribs being truncated adjacent said bridge to uncouple said ribs therefrom;

forward and aft impingement baffles disposed inside said forward and aft cavities, respectively, and spaced centrally therein by said ribs;

a trailing edge cooling circuit disposed in each of said vanes in flow communication with said aft cavity therein, and including a plurality of partitions spaced apart along said span to define corresponding discharge channels terminating at corresponding apertures at said trailing edge; and one of said partitions including an end rib extending therefrom forward into said aft cavity for abutting said aft baffle.

* * * * *